(12) United States Patent
Park

(10) Patent No.: US 8,274,972 B2
(45) Date of Patent: Sep. 25, 2012

(54) COMMUNICATION SYSTEM WITH SWITCHABLE CONNECTION

(75) Inventor: Jeong-kee Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 760 days.

(21) Appl. No.: 11/414,412

(22) Filed: May 1, 2006

(65) Prior Publication Data
US 2007/0016708 A1 Jan. 18, 2007

(30) Foreign Application Priority Data
Jul. 15, 2005 (KR) .................. 10-2005-0064371

(51) Int. Cl.
*H04L 12/50* (2006.01)
(52) U.S. Cl. ............ 370/360; 370/384; 370/395.5; 370/422; 370/426; 370/522; 333/101; 710/110; 710/113; 710/119; 710/241; 710/242; 710/243
(58) Field of Classification Search .......... 370/360, 370/384, 395.5, 422, 426, 522; 710/110, 710/113, 119, 120, 241–243; 333/101
See application file for complete search history.

(56) References Cited

U.S. PATENT DOCUMENTS

| | | | | |
|---|---|---|---|---|
| 3,792,203 | A * | 2/1974 | Martin | 379/357.04 |
| 5,963,450 | A * | 10/1999 | Dew | 700/169 |
| 6,094,088 | A * | 7/2000 | Yano | 327/534 |
| 6,233,635 | B1 * | 5/2001 | Son | 710/315 |
| 6,769,078 | B2 | 7/2004 | Barenys et al. | |
| 2004/0059852 | A1 * | 3/2004 | Sun et al. | 710/110 |

(Continued)

FOREIGN PATENT DOCUMENTS
CN 1403925 A 3/2003
(Continued)

OTHER PUBLICATIONS

Blozis et al., Philips—Interface Products Business Line Specialty Logic Product Line I2C Logic Family Overview, Jul. 4, 2004, found in http://web.archive.org/web/20040704080216/http://www.jjmb.nl/datasheets/index.php and http://web.archive.org/web/20040704080216/http://www.jjmb.nl/datasheets/i2c/presentation_i2c.pdf.*

(Continued)

*Primary Examiner* — Hoon J Chung
(74) *Attorney, Agent, or Firm* — Roylance, Abrams, Berdo and Goodman, LLP

(57) ABSTRACT

A communication system is provided, including a first master device to operate as a master of a communication according to a first protocol, a second master device to operate as a master of a communication according to a second protocol, a common slave device to operate as a slave of the communication according to the first protocol and the second protocol with respect to the first master device and the second master device, and a switch to control a connection between the common slave device and the first master device and between the common slave device and the second master device for a communication between the common slave device and one of the first master device to and the second master device. Thus, embodiments of the present invention provide a communication system that minimizes cost increases and improves communication speed in a system in which a plurality of master devices communicate with a slave device performing the same function as the master devices.

14 Claims, 4 Drawing Sheets

U.S. PATENT DOCUMENTS

| | | | | |
|---|---|---|---|---|
| 2004/0177187 | A1* | 9/2004 | Merkin | 710/107 |
| 2005/0041787 | A1* | 2/2005 | Casey et al. | 379/88.18 |
| 2006/0174044 | A1* | 8/2006 | Bomhoff et al. | 710/110 |

FOREIGN PATENT DOCUMENTS

| | | | |
|---|---|---|---|
| CN | 2629126 | Y | 7/2004 |
| CN | 1564142 | A | 1/2005 |
| JP | 04-133154 | A | 5/1992 |
| JP | 2000-165421 | | 6/2000 |
| JP | 2002-278852 | | 9/2002 |
| JP | 2002-318782 | A | 10/2002 |
| JP | 2003-085126 | A | 3/2003 |
| JP | 2003-141062 | | 5/2003 |
| JP | 2003-242048 | | 8/2003 |
| WO | WO 2004/109996 | A1 | 12/2004 |

OTHER PUBLICATIONS

Philips, PCA9541 Data Sheet—2-to-1 I2C master selector with interrupt logic and reset, Dec. 2, 2003, Philips.*
Paplinski, Chapter 3—CMOS Inverter and Multiplexer, Jul. 25, 2002, ch.3, pp. 1-20.*

* cited by examiner

COMMUNICATION SYSTEM WITH SWITCHABLE CONNECTION

CROSS-REFERENCE TO RELATED APPLICATIONS

This application claims the benefit under 35 U.S.C. §119(a) of Korean Patent Application No. 10-2005-0064371, filed in the Korean Intellectual Property Office on Jul. 15, 2005, the entire disclosure of which is incorporated herein by reference.

BACKGROUND OF THE INVENTION

1. Field of the Invention

The present invention relates to a communication system. More particularly, the present invention relates to a communication system in which a plurality of master devices communicate with a slave device having the same function as the master devices.

2. Description of the Related Art

Generally, an electronic device such as a digital television (DTV) comprises many devices, and the devices may communicate with each other. For example, there is an inter-integrated circuit (I2C) communication that can be performed between the devices. The I2C communication is suggested by Philips, and uses two communication lines of SCL and SDA for a communication between a master device and a slave device.

Here, a plurality of slave devices may be provided. The master device may communicate with the slave devices based on an address.

The master device is connected with the required slave devices for the I2C communication. In some cases, the plurality of master devices are connected with a slave device (hereinafter, referred to as a "common slave device") having the same function as the master devices for the communication therebetween.

FIGS. 1a and 1b illustrate connection methods for the communication between the master devices and the common slave devices.

FIG. 1a illustrates the master devices which use separate communication lines to be connected with the common slave devices.

At this time, a first master device and a second master device may always communicate with the common slave devices through the communication lines respectively connected therewith. However, as the common slave device having the same function as the master device is provided in the communication line connected with the respective master device, the production costs increase.

FIG. 1b illustrates the respective master devices which use a common communication line to be connected with the common slave device.

Unlike in FIG. 1a, a single common slave device is required in FIG. 1b, thereby saving the additional costs of a second common slave device. However, the first master device and the second master device may communicate with the other slave devices as well as the common slave device, only if they operate as a master. Thus, the first master device and the second master device may not simultaneously communicate with the common slave device and the other slave devices. For example, while the first master device communicates with the common slave device, the second master device may not communicate with the other slave devices, as well as with the common slave device, thereby lowering the overall communication speed of the system.

Accordingly, a need exists for a system configuration and method that minimizes cost increases and improves communication speed, and which can be provided in a case where a common slave device performing the same function as master devices is installed in a system to communicate with a plurality of master devices.

SUMMARY OF THE INVENTION

Accordingly, it is an aspect of embodiments of the present invention to substantially solve the above and other problems, and provide a communication system that minimizes cost increases and improves communication speed in which a system having a plurality of master devices communicate with a slave device performing the same function as the master devices.

Additional aspects and/or advantages of embodiments of the present invention will be set forth in part in the description which follows and, in part, will be obvious from the description, or may be learned by practice of the present invention.

The foregoing and/or other aspects of embodiments of the present invention are also achieved by providing a communication system, comprising a first master device to operate as a master of a communication according to a first protocol, a second master device to operate as a master of a communication according to a second protocol, a common slave device to operate as a slave of the communication according to the first protocol and the second protocol with respect to the first master device and the second master device, and a switch to control a connection between the common slave device and the first master device and between the common slave device and the second master device for a communication between the common slave device and one of the first master device and the second master device.

According to another aspect of embodiments of the present invention, at least one of the first protocol and the second protocol comprises an inter-integrated circuit (I2C) communication protocol.

According to another aspect of embodiments of the present invention, the first master device supplies a first switching control signal to the switch to be connected with the common slave device in a case where it communicates with the common slave device according to the I2C protocol.

According to another aspect of embodiments of the present invention, the second master device requests a switching connection to the first master device in a case where it communicates with the common slave device according to the I2C protocol, and the first master device supplies a second switching control signal to the switch according to the request of the switching connection to connect the common slave device and the second master device.

According to another aspect of embodiments of the present invention, the first master device determines whether the communication between the second master device and the common slave device according to the I2C protocol is completed, and supplies the first switching control signal to the switch to connect the common slave device and the first master device if it is determined that the communication between the second master device and the common slave device according to the I2C protocol is completed, in a case where the first master device communicates with the common slave device according to the I2C protocol.

According to another aspect of embodiments of the present invention, the first master device performs two-way communication with the second master device and determines whether the communication between the second master device and the common slave device according to the I2C protocol is completed based on a response of the second master device according to the two-way communication.

BRIEF DESCRIPTION OF THE DRAWINGS

The above and/or other aspects and advantages of embodiments of the present invention will become apparent and more readily appreciated from the following description of the embodiments, taken in conjunction with the accompanying drawings, of which.

Throughout the drawings, like reference numerals will be understood to refer to like parts, components and structures.

DETAILED DESCRIPTION OF EXEMPLARY EMBODIMENTS

Figure 1A:
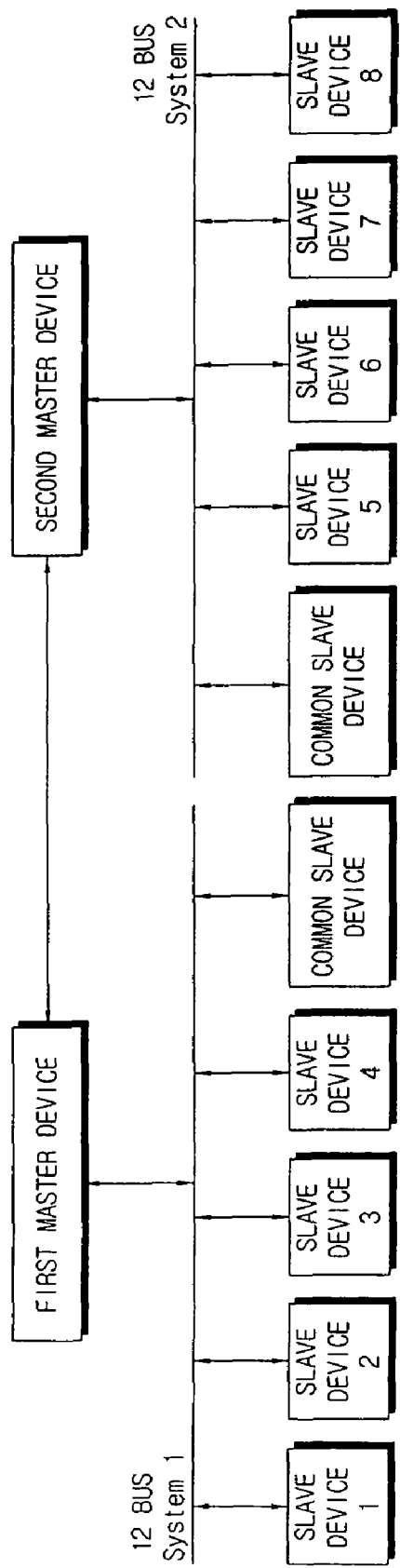
FIGS. 1a and 1b are block diagrams of a conventional communication system which comprises a plurality of master devices and common slave devices.
Figure 1B:
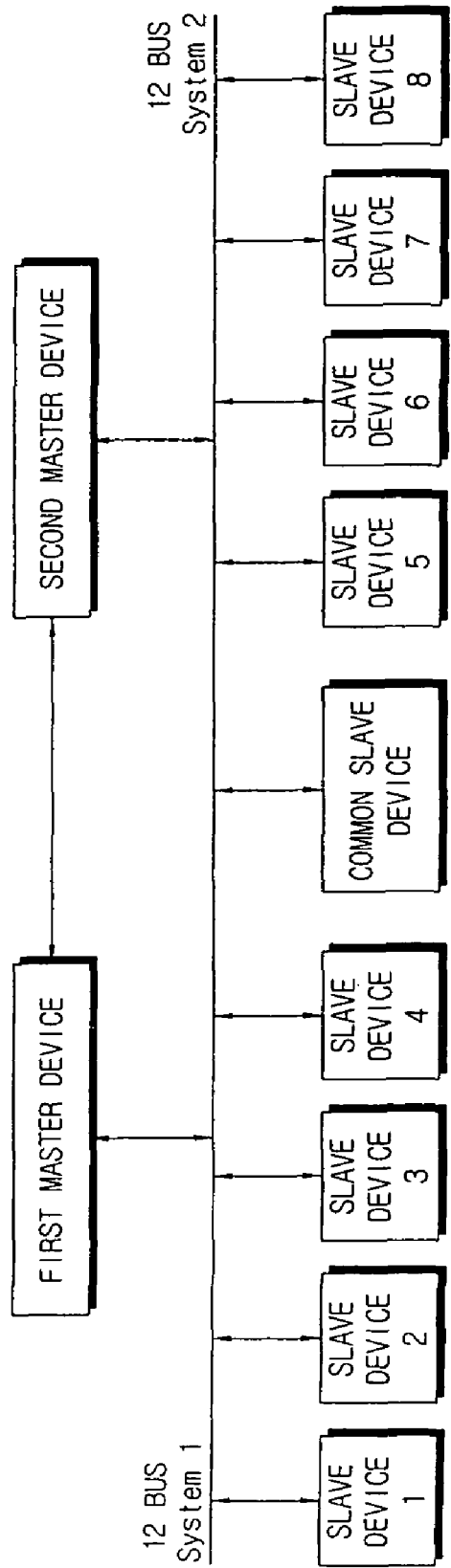

Reference will now be made in detail to embodiments of the present invention, examples of which are illustrated in the accompanying drawings, wherein like reference numerals refer to like elements throughout.

Figure 2:
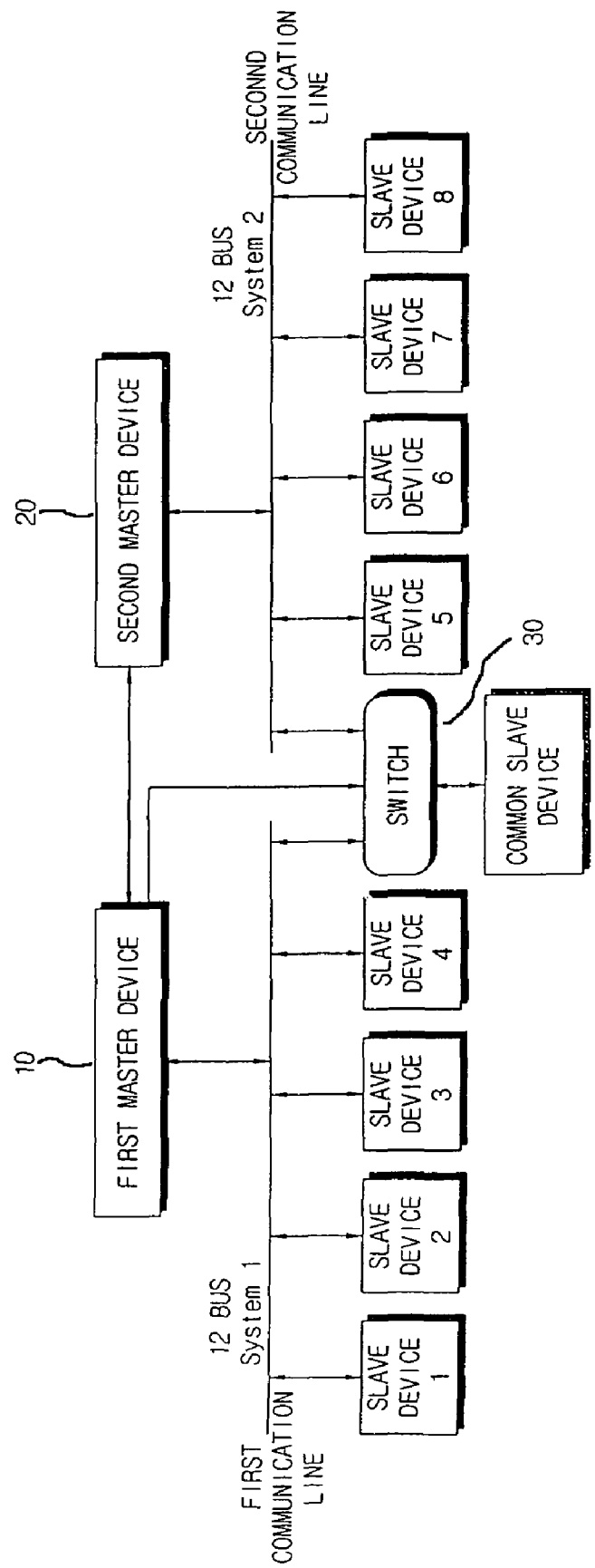
FIG. 2 is a block diagram of a communication system according to an embodiment of the present invention.

As shown in FIG. 2, a communication system according to embodiments of the present invention comprises a first master device 10, a second master device 20, a common slave device 40 and a switch 30 therebetween. Slave devices 1, 2, 3 and 4 are coupled to the first master device 10 and switch 30 via a first communication line, and slave devices 5, 6, 7 and 8 are coupled to the second master device 20 and switch 30 via a second communication line. Although only slave devices 1-8 are shown in FIG. 2, any number or combination of slave devices can be included.

The first master device 10 operates as a master of a communication according to a first protocol. The second master device 20 operates as a master of a communication according to a second protocol. Here, the first and second protocols may be identical or different from each other. For example, the first protocol may comprise an inter-integrated circuit (I2C) communication protocol and the second protocol may comprise a serial data communication protocol which uses universal asynchronous receiver/transmitter (UART).

Hereinafter, the first and second protocols comprise the I2C communication protocol as an example for the illustration of exemplary embodiments of the present invention.

The common slave device 40 operates as a slave according to the I2C communication protocol. The common slave device 40 is connected with either the first master device 10 or the second master device 20 according to an operation of the switch 30 (as described in greater detail below) to communicate with each.

The switch 30 controls a connection between the common slave device 40 and the first master device 10 or between the common slave device 40 and the second master device 20 to allow the common slave device 40 to selectively communicate with either the first master device 10 or the second master device 20.

That is, the switch 30 connects the common slave device 40 and the first communication line to allow the first master device 10 and the common slave device 40 to communicate with each other. Here, the first communication line is provided to allow the first master device 10 to communicate with at least one of slave devices 1-4. The first communication line comprises an SCL line to receive a clock and an SDA line to receive data, but is not limited thereto.

The switch 30 can also connect the common slave device 40 and a second communication line to allow the second master device 20 and the common slave device 40 to communicate with each other. Here, the second communication line is substantially equivalent to the first communication line. The second communication line is provided to allow the second master device 20 to communicate with at least one of slave devices 5-8.

Here, the first communication line and the second communication line are separated by the switch 30.

The first master device 10 supplies a first switching control signal to the switch 30 to be connected with the common slave device 40 if it desires to communicate with the common slave device 40. The switch 30 then connects the first communication line and the common slave device 40 according to the supplied first switching control signal.

Then, the first master device 10 may communicate with the common slave device 40 through the first communication line according to the I2C protocol.

The second master device 20 may request a switching connection to the first master device 10 if it desires to communicate with the common slave device 40. The first master device 10 then supplies a second switching control signal to the switch 30 to connect the common slave device 40 and the second master device 20 according to the switching connection request. The switch 30 connects the second communication line and the common slave device 40 according to the supplied second switching control signal. At this time, the connection between the first communication line and the common slave device 40 may be cut off.

Then, the second master device 20 may communicate with the common slave device 40 through the communication line according to the I2C protocol.

If the first master device 10 supplies the first switching control signal to the switch 30 in a case where the second master device 20 is connected with the common slave device 40 to communicate with each other, the switch 30 cuts off the connection between the common slave device 40 and the second communication line to connect the common slave device 40 and the first communication line. Then, the communication between the second master device 20 and the common slave device 40 may be cut off by force.

To prevent the forced cut-off of the switch 30, the first master device 10 may check if the communication between the second master device 20 and the common slave device 40 is cut off or completed before it supplies the first switching control signal.

The first master device 10 may perform a two-way communication with the second master device 20, and request a response from the second master device 20 concerning the communication cut-off, thereby checking to determine whether the communication between the second master device 20 and the common slave device 40 is completed. The two-way communication between the first master device 10 and the second master device 20 is performed through a communication line which is preferably independent from the first communication line and the second communication line. The two-way communication between the first master device 10 and the second master device 20 may be based on an additional protocol, but is not limited thereto.

If the first master device 10 receives a response from the second master device 20 that the communication with the common slave device 40 is completed, it may supply the first switching control signal to the switch 30 to be connected with the common slave device 40.

Thus, the first master device 10 may communicate with the common slave device 40 without forcibly completing the communication between the second master device 20 and the common slave device 40.

As described above, the first master device 10 and the second master device 20 perform the two-way communication with each other as an example in embodiments of the present invention to check whether the communication between the second master device 20 and the common slave device 40 is completed. If the communication between the second master device 20 and the common slave device 40 is completed, the first master device 10 may be informed of the completion state through one-way communication from the second master device 20.

As shown in FIG. 2, the second master device 20 supplies the second switching control signal to the switch 30 through the first master device 10 to communicate with the common slave device 40, but is not limited thereto. Alternatively, the second master device 20 may directly supply the second switching control signal to the switch 30.

Figure 3:
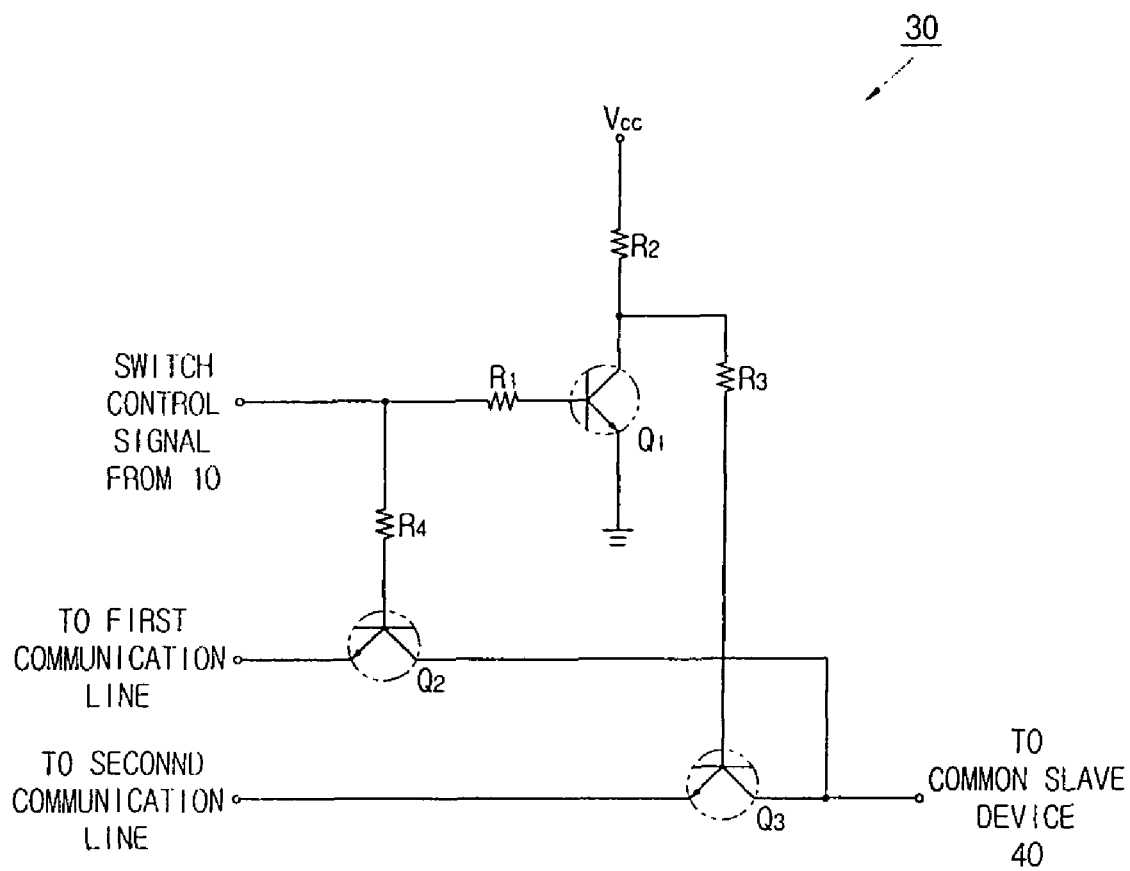
FIG. 3 illustrates an example of a switch configuration in FIG. 2.

Referring to FIG. 3, an example of a circuit configuration of the switch 30 in FIG. 2 will be described. The circuit of switch 30 comprises transistors Q1, Q2 and Q3, and resistors R1, R2, R3 and R4. The switch control signal from the first master device 10 is coupled to the base of transistor Q1 via resistor R1, and is coupled to the base of transistor Q2 via resistor R4. The emitter of transistor Q2 is coupled to the first communication line, and the collector of transistor Q2 is coupled to the collector of transistor Q3 and the common slave device 40. The collector of transistor Q1 is coupled to a voltage Vcc via resistor R2 and is coupled to the base of transistor Q3 via resistor R3, and the emitter of transistor Q1 is coupled to ground. The emitter of transistor Q3 is coupled to the second communication line.

The first master device 10 supplies the switching control signal to turn on the switch 30 to communicate with the common slave device 40. Then, the transistor Q2 is turned on, and the common slave device 40 and the first communication line are connected with each other. As the transistor Q1 is turned on, a current flowing through the resistor R3 decreases and the transistor Q3 is turned off. Also, the connection between the common slave device 40 and the second communication line is cut off.

Alternately, the first master device 10 supplies the switching control signal to turn off the switch 30 and allow the second master device 20 and the common slave device 40 to communicate with each other. Then, the transistor Q2 is turned off and the connection between the common slave device 40 and the first communication line is cut off. As the transistor Q1 is also turned off, a current flows through resistor R3. Then, the transistor Q3 is turned on and the common slave device 40 and the second communication line are connected with each other.

As described above, the switch 30 may be provided as transistors or resistors, but is not limited thereto. Alternatively, the switch 30 may be provided as a single integrated circuit (IC).

Although a number of exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A communication system, comprising:
    a first master device to operate as a master of a first communication according to a first protocol;
    a second master device to operate as a master of a second communication according to a second protocol;
    a common slave device to operate as a slave of the communications according to the first protocol and the second protocol with respect to the first master device and the second master device; and
    a switch electrically coupled between the common slave device and the first master device, and between the common slave device and the second master device, for selectively controlling the communication between the common slave device and any one of the first master device and the second master device,
    wherein the common slave device is coupled to only one of the first master device and the second master device,
    wherein any one of the first protocol and the second protocol comprises an inter-integrated circuit (I2C) communication protocol, and wherein the second protocol is different from the first protocol.

2. The communication system according to claim 1, wherein the first master device is configured to:
    supply a first switching control signal to the switch to be connected with the common slave device in a case wherein the first master device desires to communicate with the common slave device.

3. The communication system according to claim 2, wherein the second master device is configured to:
    provide a switching connection request to the first master device in a case wherein the second master device desires to communicate with the common slave device, and wherein the first master device is configured to supply a second switching control signal to the switch in response to the request to connect the common slave device and the second master device.

4. The communication system according to claim 3, wherein the first master device is configured to:
    determine whether the second communication between the second master device and the common slave device is completed; and
    supply the first switching control signal to the switch to connect the common slave device and the first master device if it is determined that the second communication between the second master device and the common slave device is completed.

5. The communication system according to claim 4, wherein the first master device is configured to:
    perform two-way communication with the second master device and determine whether the second communication between the second master device and the common slave device is completed based on a response of the second master device according to the two-way communication.

6. The communication system according to claim 1, wherein the switch comprises:
    a first transistor electrically coupled between said common slave device and said first master device to control said first communication according to the first protocol between said common slave device and said first master device; and
    a second transistor electrically coupled between said common slave device and said second master device to control said second communication according to the second protocol between said common slave device and said second master device, wherein said first transistor and said second transistor are controlled by a switching control signal.

7. The communication system according to claim 1, wherein said switch is configured to permit communication between said common slave device and only one of said first master device and said second master device at a time.

8. A method of controlling a communication system having a plurality of master devices that communicate with a common slave device performing the same function as the master devices, comprising:

controlling a first master device of the plurality of master devices to operate as a master of a first communication according to a first protocol;

controlling a second master device of the plurality of master devices to operate as a master of a second communication according to a second protocol;

controlling the common slave device to operate as a slave of the communications according to the first protocol and the second protocol with respect to the first master device and the second master device; and controlling a switch electrically coupled between the common slave device and the first master device, and between the common slave device and the second master device, for selectively controlling the communication between the common slave device and any one of the first master device and the second master device, wherein the common slave device is coupled to only one of the first master device and the second master device, wherein any one of the first protocol and the second protocol comprises an inter-integrated circuit (I2C) communication protocol, and wherein the second protocol is different from the first protocol.

9. The method according to claim 8, further comprising:

supplying a first switching control signal to the switch to connect the first master device to the common slave device in a case wherein the first master device desires to communicate with the common slave device.

10. The method according to claim 9, further comprising:

determining whether the second communication between the second master device and the common slave device is completed; and supplying the first switching control signal to the switch to connect the common slave device and the first master device if it is determined that the second communication between the second master device and the common slave device is completed.

11. The method according to claim 10, further comprising:

controlling the first master device to perform two-way communication with the second master device to determine whether the second communication between the second master device and the common slave device is completed.

12. The method according to claim 8, further comprising:

controlling the second master device to provide a switching connection request to the first master device in a case wherein the second master device desires to communicate with the common slave device.

13. The method according to claim 12, further comprising:

supplying a second switching control signal to the switch in response to the request to connect the common slave device and the second master device.

14. The method according to claim 8, wherein the step of controlling said switch comprises:

controlling a first transistor electrically coupled between said common slave device and said first master device to control said first communication according to the first protocol between said common slave device and said first master device; and controlling a second transistor electrically coupled between said common slave device and said second master device to control said second communication according to the second protocol between said common slave device and said second master device, wherein said switch is configured to permit communication between said common slave device and only one of said first master device and said second master device at a time.

* * * * *